US006987749B2

(12) United States Patent
Cai et al.

(10) Patent No.: US 6,987,749 B2
(45) Date of Patent: Jan. 17, 2006

(54) METHOD FOR RADIO BEARER OPTIMIZATION THROUGH AN ADAPTIVE ACCESS PROBABILITY FACTOR

(75) Inventors: Zhijun Cai, North Richland Hills, TX (US); Ban Al-Bakri, Juan les Pins, Alp Maritim (FR); Richard C. Burbidge, Hook (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/874,763

(22) Filed: Jun. 22, 2004

(65) Prior Publication Data

US 2005/0281209 A1   Dec. 22, 2005

(51) Int. Cl.
 *H04B 7/216* (2006.01)
(52) U.S. Cl. ..................................... 370/335; 370/342
(58) Field of Classification Search ...................... None
 See application file for complete search history.

(56) References Cited

U.S. PATENT DOCUMENTS

2003/0228865 A1 * 12/2003 Terry ........................ 455/422.1
2004/0103435 A1 * 5/2004 Yi et al. ........................ 725/81
2004/0131026 A1 * 7/2004 Kim et al. ................... 370/328
2004/0157640 A1 * 8/2004 Pirskanen et al. ........ 455/552.1
2004/0196803 A1 * 10/2004 Yi et al. ..................... 370/328

* cited by examiner

Primary Examiner—Huy D. Vu
Assistant Examiner—Cynthia L. Davis
(74) Attorney, Agent, or Firm—Frank J. Bogacz; Kevin D. Wills

(57) ABSTRACT

A communication system determines whether to establish a point-to-point or point-to-multipoint communication for conveyance of Multimedia Broadcast Multicast Services (MBMS) data based on a number of user equipments being serviced by the communication system for MBMS service. The system broadcasts an access probability factor in a control message to the user equipments. For a large number of MBMS users being counted, the method will select a point-to-multipoint broadcast. If the number of user equipments being counted is relatively small, the access probability factor is modified by a ratio of the number of point-to-point connections over the point-to-multipoint connections over the number of users being counted. The UE may need to join multiple base stations' in the counting procedure to obtain the system diversity gain.

28 Claims, 4 Drawing Sheets

METHOD FOR RADIO BEARER OPTIMIZATION THROUGH AN ADAPTIVE ACCESS PROBABILITY FACTOR

BACKGROUND OF THE INVENTION

The present invention pertains to packet data communication systems and more particularly to access to Multimedia Broadcast Multicast Service in the packet data communication system.

Accordingly, what is needed is a method for maximizing communication efficiency for group calls in a communication system. The Multimedia Broadcast Multicast Service (MBMS) service provides for a multicast and unicast of MBMS data, typically in a format of Internet Protocol (IP) data packets to one or more of the user equipments UEs. In order to ensure that the air interface resources of the packet data communication system are not wasted, the system must first estimate the number of recipients, that is subscribed user equipments (UEs), in a cell providing MBMS data. Based on the estimated number of recipients, the system then determines whether to establish a Point-To-Multipoint (PTM) communication channel in the cell or a Point-To-Point (PTP) channel to each recipient, and also how to optimize the radio bearers. In general, when the estimated number of recipients in the cell exceeds an operator defined threshold, the system establishes a PTM channel in the cell. When the estimated number of recipients in the cell is less than the operator defined threshold, the system establishes a PTP channel to each subscribing MS in the cell. Further, in order to exploit the diversity benefit, even if some neighboring cells do not have enough MBMS UEs there for PTM transmission, they may still choose the PTM transmission to obtain the diversity benefit for the system.

Typically, the system estimates the number of recipients based on a number of UEs subscribing to MBMS services that are currently connected to the network. Based on the estimate, the system determines whether to establish a PTM communication channel in the cell or a PTP communication channel to each UE. However, such a determination fails to account for idle mode MSs and URA_PCH mode UEs serviced by the RAN and subscribing to the MBMS service. The idle mode users and URA_PCH mode users should also be counted. The system then broadcasts a MBMS notification to all UEs in the cell. In response to receiving the MBMS notification, each UE in the cell that subscribes to the MBMS service may then convey a connection request. Upon receiving the connection requests from each of the subscribing UEs, the system decides to establish a PTM communication channel or establishes PTP communication channels with each responding UE.

In order to limit the number of connection requests generated in response to the MBMS notification, it has been proposed to broadcast an access probability factor in conjunction with the MBMS notification. However, a problem arises in that, typically, the system is not aware of a number of idle mode UEs in a cell that have subscribed to an MBMS service. When the access probability factor is set to a high value and the number of idle mode UEs subscribing to the MBMS service is also large, an access channel can be overloaded by the number of connection requests generated in response to the MBMS notification. On the other hand, when the access probability factor is set to a low value and the number of idle mode MSs subscribing to the MBMS service is small, the number of connection requests received by the system in response to a counting request may be insufficient to invoke establishment of a PTM channel.

The process of counting the idle mode UEs may substantially load the radio access channel (RACH). In addition it is time consuming to count a sufficient number of UEs in order to make the point-to-point or point-to-miltipoint decision by the system.

Further, the diversity can give much benefit to the MBMS reception performance.

Accordingly, it would be highly desirable to have an adaptive access probability factor which will adapt the access probability factor to the response received from the counting process.

PREFERRED EMBODIMENT OF THE INVENTION

Figure 1:
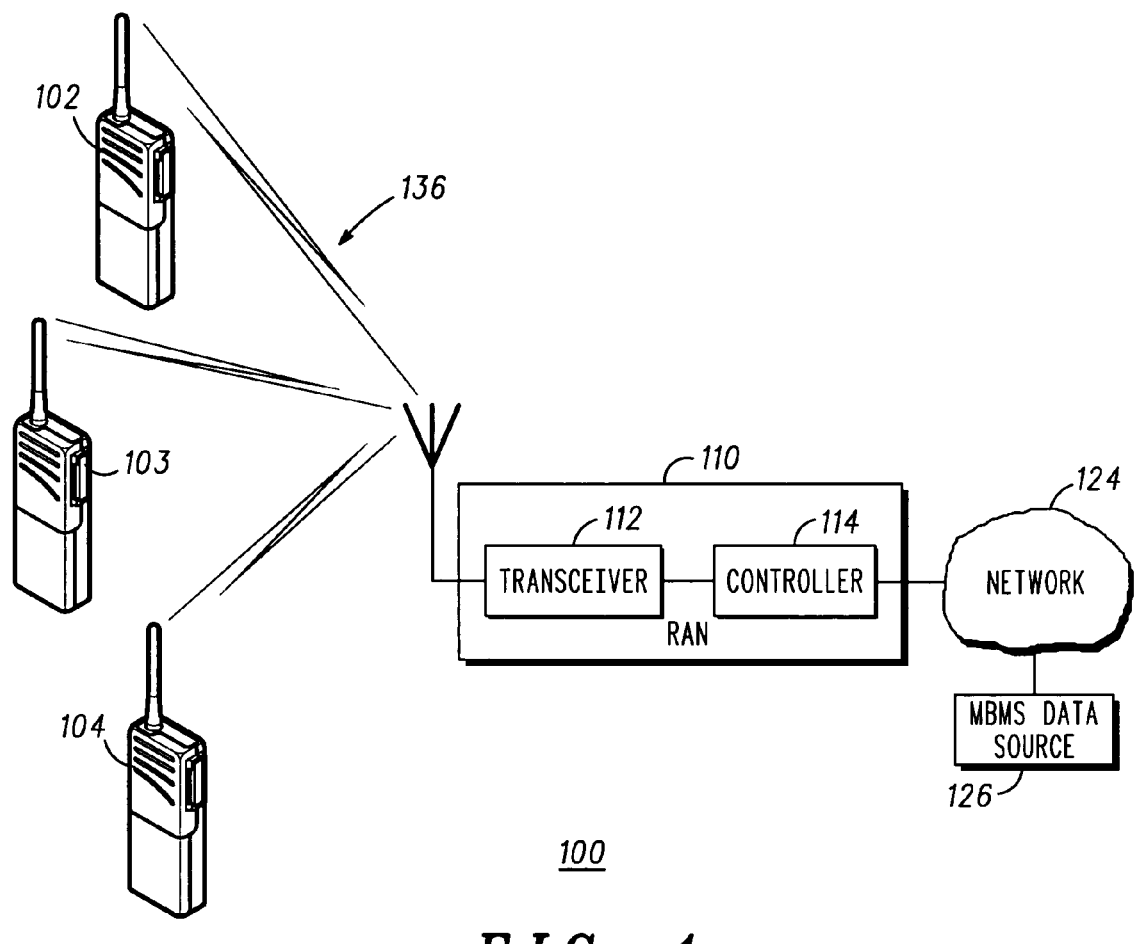
FIG. 1 is a block diagram of a wireless packet data communication system in accordance with the present invention.

The present invention may be more fully described with reference to FIGS. 1–7. FIG. 1 is a block diagram of a wireless communication system 100 in accordance with the present invention. Communication system 100 includes multiple user equipments (UEs) or mobile stations (MBS) 102–104 (three shown) in wireless communication with a Radio Access Network (RAN) 110. RAN 110 includes one transceiver, 112 that is operably coupled to a controller 114, preferably a Radio network Controller (RNC). Communication system 100 further includes a coupling to network 124 and to MBMS data source 126.

Each of MSs 102–104 subscribes to a Multimedia Broadcast Multicast Service (MBMS) service provided by communication system 100, which service provides for a distribution of MBMS data to the MSs. MBMS services are described in detail in the 3GPP (Third Generation Partnership Project) standards, and in particular 3GPP TS (Technical Specification) 25.346 v0.5.0, 3GPP TS 23.846 v6.0.0, 3GPP TS 22.146 v6.0.0, 3GPP TR (Technical Report) 21.905 v5.4.0, and Report R2-030063, which specifications and reports are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France.

Ran 110 provides communications services to mobile stations, such as MS 102–104, located in a coverage area, such as a cell, serviced by the Ran via an air interface 128.

Communication system 100 may include a Universal Mobile Telecommunication Service (UMTS) communication system that operates in accordance with the 3GPP (Third Generation Partnership Project) standards. However, those who are of ordinary skill in the art realize that communication system 100 may operate in accordance with any wireless telecommunication system, such as but not limited to a General Packet Radio Service (GPRS) communication system, a Code Division Multiple Access (CDMA) 2000 communication system, or an Orthogonal Frequency Division Multiple Access (OFDM) communication system.

Communication system 100 further includes a Multimedia Broadcast Multicast Service (MBMS) data source 126, such as an Internet Protocol (IP) multicast server, that is coupled to network 124, such as an IP network. Network 124 is coupled to RAN controller 114. As part of the MBMS service subscribed to by each of MSs 102–104, MBMS data source 126 sources MBMS data, typically in the form of IP data packets, to MSs 102–104 via support node 120 and RAN 110, and in particular via controllers servicing the service subscribers, that is, controller 114 with respect to MSs 102–104. When RAN 110, and in particular controller 114, receives the MBMS data, the RAN must then determine whether to convey the MBMS data to each of the subscribing MSs serviced by the RAN, that is MSs 102–104, via a multicast, or Point-To-Multipoint (PTM), communication channel or individual unicast, or Point-To-Point (PTP), communication channels.

In order to determine whether to establish a PTM communication channel or individual PTP communication channels, RAN 110 must first estimate the number of MSs located in the coverage area serviced by the RAN and subscribing to the MBMS service sourcing the MBMS data and determine an access probability factor based on the estimate. In prior art proposals, a RAN determines an access probability factor based on a number of MSs with active connections to the RAN and subscribing to the MBMS service. However, such a determination fails to account for idle mode MSs and URA_PCH mode users serviced by the RAN and subscribing to the MBMS service. In the following, the idle mode users refer to both the idle mode users and the URA_PCH mode users. As a result, in the prior art, when a large number of idle MSs subscribe to the service and the access probability factor is set to a high value, the determined an access probability factor could result in an overloading of an access channel by a number of MSs responding to an MBMS notification or, when a small number of idle MSs subscribed to the service and the RAN set an access probability factor to a low value, the number of connection requests received by the RNC in response to a counting request may be insufficient to invoke establishment of a PTM channel when a PTM channel may be the most efficient scheme for disseminating the multimedia data.

In order to prevent radio access channel 136 from being overwhelmed by connection requests in response to an MBMS notification, and to provide for an appropriate selection of a PTM connection or individual PTP connections for conveyance of MBMS data, communication system 100 provides for a more accurate method of estimating a number of MSs subscribing to an MBMS service and located in a service area of RAN 110 while limiting a number of MSs responding to the MBMS notification, and further provides an adaptively determined access probability factor to optimize the number of responses and the estimate of the number of subscribing MSs.

Communication system 100 employs the use of probability to determine a number of MSs subscribing to the MBMS service and determining whether to establish a point-to-multipoint or a point-to-point communication connection for conveyance of MBMS data. Controller 114 of RAN 110 determines the quantity of mobile stations subscribing to the MBMS service.

Figure 2:
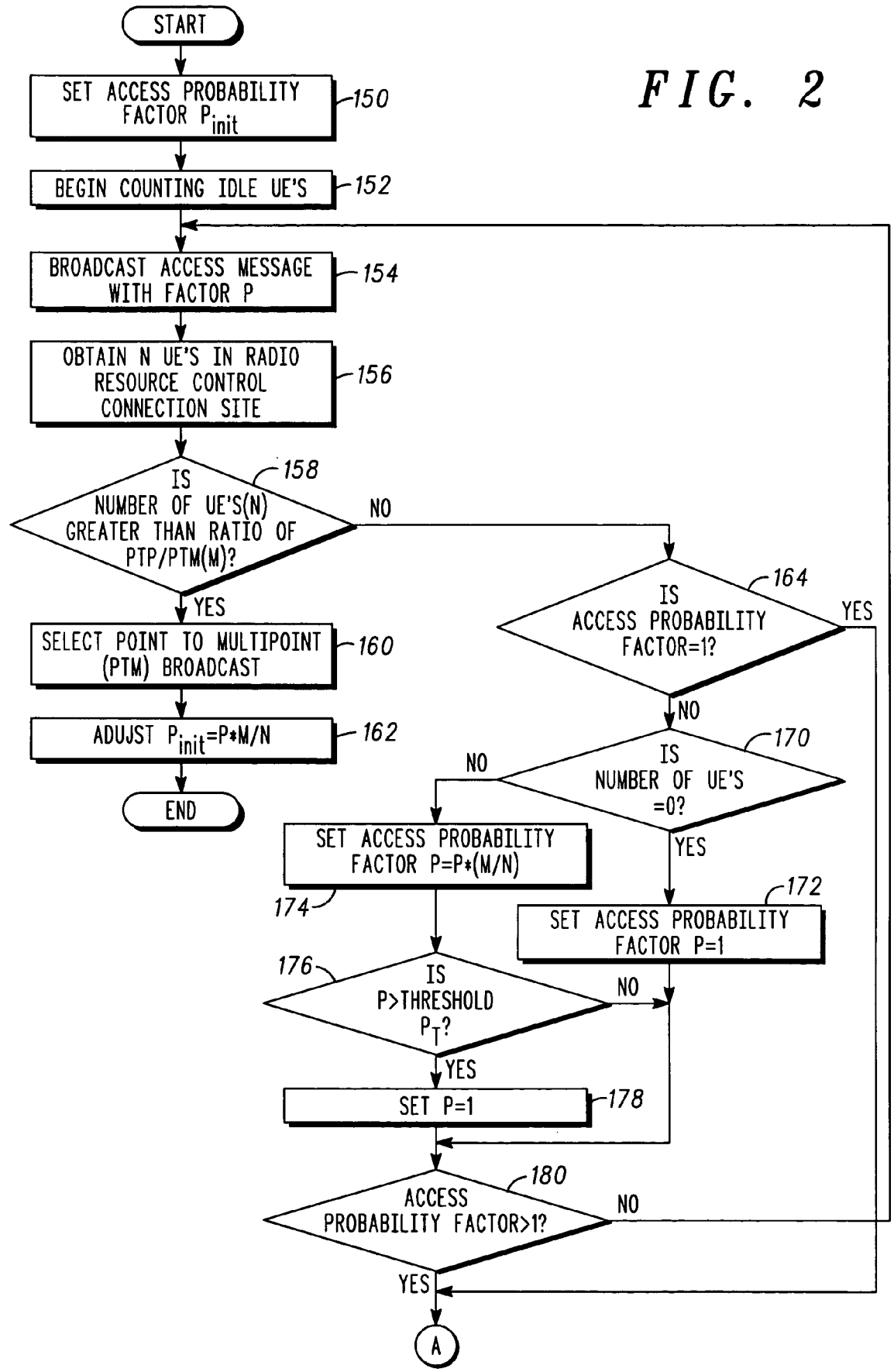
FIGS. 2 and 3 are a flow chart of a method for adaptively setting an access probability factor in accordance with the present invention.
Figure 3:
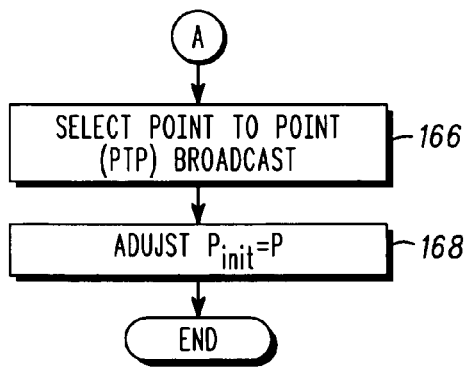

Referring to FIGS. 2 and 3, a method for adaptively setting an access probability factor is shown. Controller 114 sets 150 the access probability factor P equal to $P_{init}$ which is the initial value of the access probability factor. RAN 110 then broadcasts the access probability factor P to each of the MSs 102–104. Next controller 114 begins counting the idle MSs or UEs, block 152. The probability access factor P is broadcast in control messages to the user equipments 102–104, block 154.

In response to broadcasting one or more control messages that include the access probability factor P, controller 114 obtains a number N responses for establishing a link to the access channel 136. Controller 114 obtains the number N of the idle mode UEs subscribing to the MBMS service by counting by one or more control connected base stations of RAN 110 the number of MBMS service subscribers, block 156.

Next, controller 114 determines whether N the number of idle mode UEs responding to the counting is greater than the ratio of point-to-point connections over point-to-multipoint connections M, block 158. If the number of idle mode UEs N is greater than the ratio M, block 158 transfers control to block 160 via the yes path. Since the number of idle user equipments which may use MBMS services is quite large, block 160 selects the point-to-multipoint broadcast mode for the MBMS services. Next, controller 114 adjusts the $P_{init}$ to be equal to the access probability factor P multiplied by the ratio of M over N. M is the ratio of point-to-point connections divided by the point-to-multipoint connections. N is the number of UEs in the idle mode with MBMS services, block 162. The process is then ended.

If in block 158, the number of UEs N is less than or equal to M, the ratio of point-to-point divided by point-to-multipoint connections, then block 158 transfers control to block 164 via the no path. Then the controller determines whether the access probability factor P is equal to 1. If the access probability factor P is equal to 1, block 164 transfers control to block 166 via the yes path.

Then a point-to-point channel broadcast connection is selected by the controller, block 166. This establishes a coupling from RAN 110 to user equipment 102, for example.

Then the controller adjusts the initial access probability factor $P_{init}$ to be equal to P, which in this case is 1, block 168. Then the process is ended.

If in block 164, P is not equal to 1, block 164 transfers control to block 170 via the no path. In block 170 the controller determines whether the number of idle UEs M is equal to zero. If M, the number of idle UEs, is equal to zero, block 170 transfers control to block 172 via the yes path. The controller then sets the access probability factor P equal to 1, block 172. Block 172 then transfers control to block 180.

If M, the number of idle mode UEs, is not equal to zero, block 170 transfers control to block 174 via the no path. Controller then calculates a new access probability factor P to be equal to the old access probability factor P multiplied by the ratio of M over N, block 174. Again, M is the ratio of the number of point-to-point connections divided by the number of point-to-multipoint connections in the RAN.

Next, the controller determines whether the access probability factor P is greater than $P_t$, the access probability factor threshold, block 176. When the access probability factor P is less than the threshold value $P_t$, the radio access channel 136 load can be reduced. If the access probability factor P is greater than the threshold $P_t$, block 176 transfers control to block 178 via the yes path. In block 178 the controller sets the access probability factor P equal to 1 and then transfers control to block 180.

In block 180 the controller determines whether the access probability factor P is greater than 1. If not, block 180 transfers control to block 154 via the no path. Block 154 then broadcasts the new access probability factor P in a control message.

If the access probability factor P is less than or equal to 1, block 180 transfers control to block 166 via the yes path. Since the access probability factor is typically less than 1, the controller selects a point-to-point channel broadcast. Then the controller adjusts the access probability factor $P_{init}$ to be equal to the access probability factor P. Then the process is ended.

In the above method if the received response from the UEs is greater than the threshold, a point-to-multipoint channel broadcast will be selected and the initial access probability factor is updated. If the received response from the UEs is small, the access probability factor is updated depending upon the access channel loading and the new access probability factor is broadcast.

When the number of user equipments is large, this method will converge the value of P to a minimal required level to provide efficient loading of radio access channel. When the number of user equipments is small, this method can adaptively increase the value of the access probability factor P and converge quickly the access probability value to a minimal required level for point-to-point/point-to-multipoint transmissions.

Figure 4:
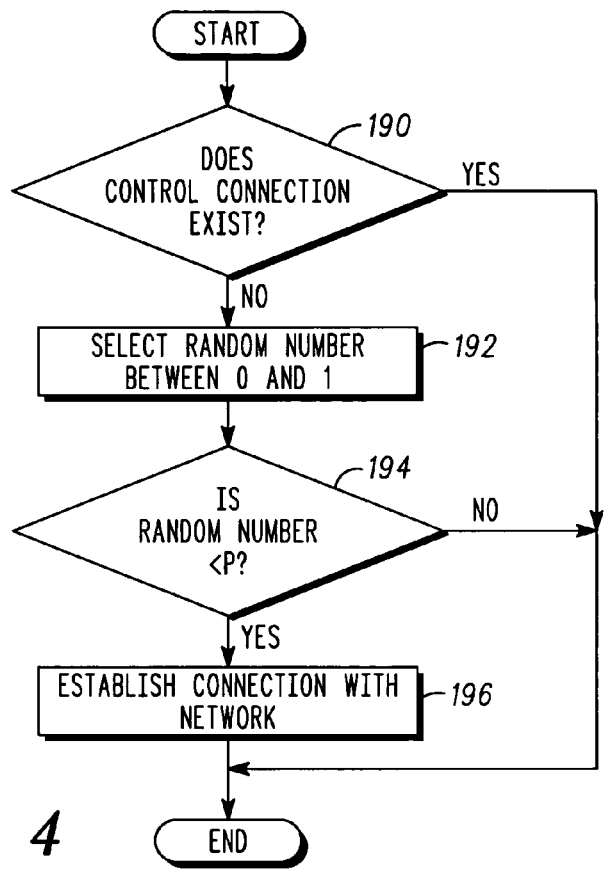
FIG. 4 is a flow chart of another embodiment of a method for setting an access probability factor in accordance with the present invention.

Referring now to FIG. 4, the method for user equipment 102–104 is shown. The process is started and block 190 is entered. The user equipment determines whether a radio access channel connection is already in existence. If it is, block 190 transfers control to block 191 and the process is ended.

If the connection does not exist, block 190 transfers control to block 192. In block 192, the user equipment selects a random number between zero and one (0 and 1), inclusive of zero and one.

Next, the user equipment determines whether the selected random number is less than P, the access probability factor. If the selected random number is greater than or equal to the access probability factor P, block 194 transfers control via the NO path to end the process. If the selected random number is less than the access probability factor, block 194 transfers control to block 196 via the yes path. The UE then requests establishment of a point-to-point connection with the network, block 196. Then the process is ended.

Figure 5:
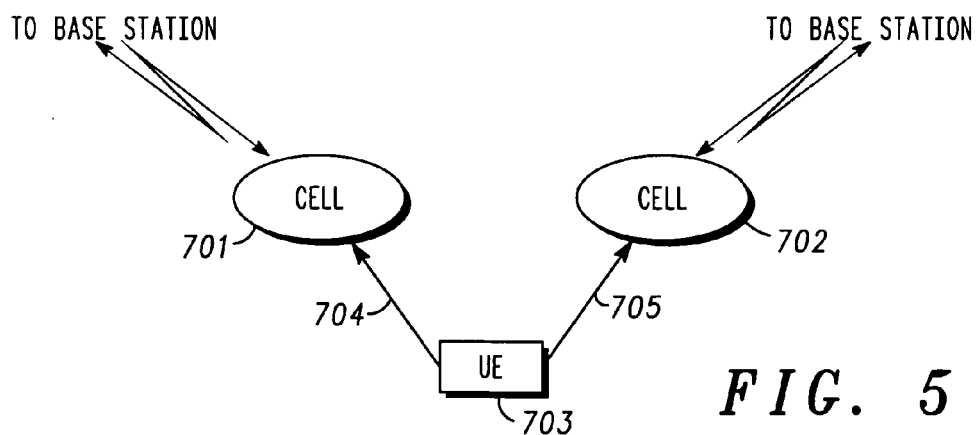
FIG. 5 is a block diagram of a counting operation by base stations in accordance with the present invention.

FIG. 5 depicts two cells and base stations (not shown) coupled to a user equipment. Currently, a cell only counts the UEs which regards the cell as the strongest one. This may potentially reduce the performance. For example, if 50 UEs at the cell edge of the cell 1 and cell 2, and all of them regards cell 1 as the strongest cell (cell 2 as the second strongest cell). It is better to turn on both cells in PTM mode instead of turning cell 1 on. It is desirable for the cells to count all the UEs that regard the cell as strongest one or regard the cell as the secondary strongest one. The information can then be used for the radio bearer setup optimization.

FIG. 5, describes the counting procedure and how the counting procedures work to obtain the diversity. Cell 701 of a first base station and cell 702 of a second base station (the base stations are not shown) are the strongest cell and the secondary strongest cell for the UE 703, respectively. The UE 703 is in idle mode and should be counted for the MBMS radio bearer set up. Typically, the UE needs to join the counting procedure both in cell 701 and cell 702 though the channel 704 and 705, respectively. Therefore, both cell 701 and cell 702 may count the UE 703 for their radio bearer set up decision. In this way, the diversity gain may be obtained.

Figure 6:
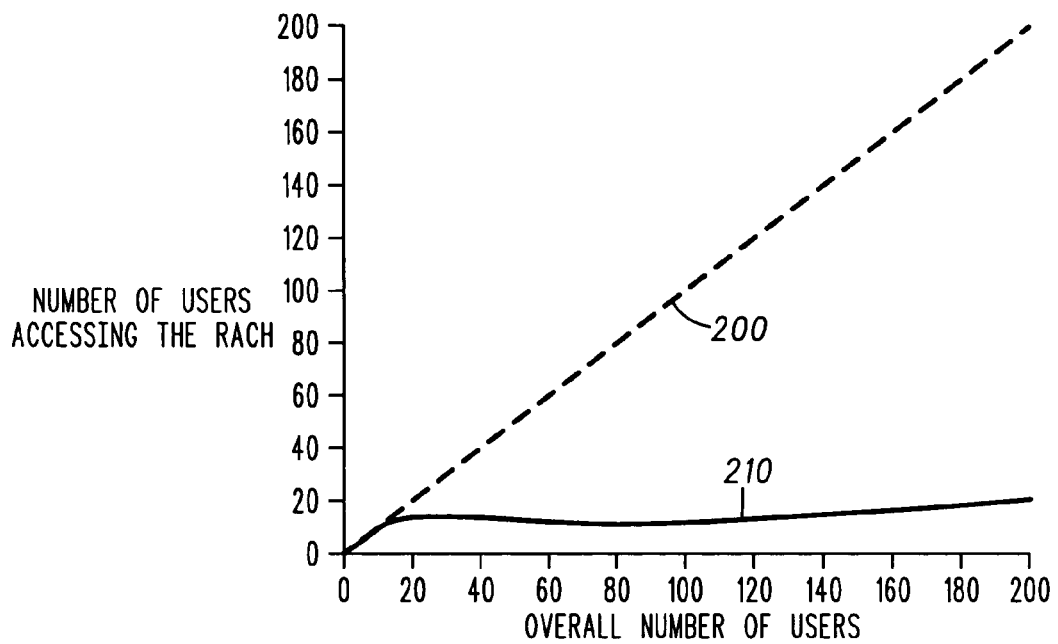
FIG. 6 is a graphic representation of a relationship between a number of users accessing an access channel and an overall number of users in accordance with the present invention.
Figure 7:
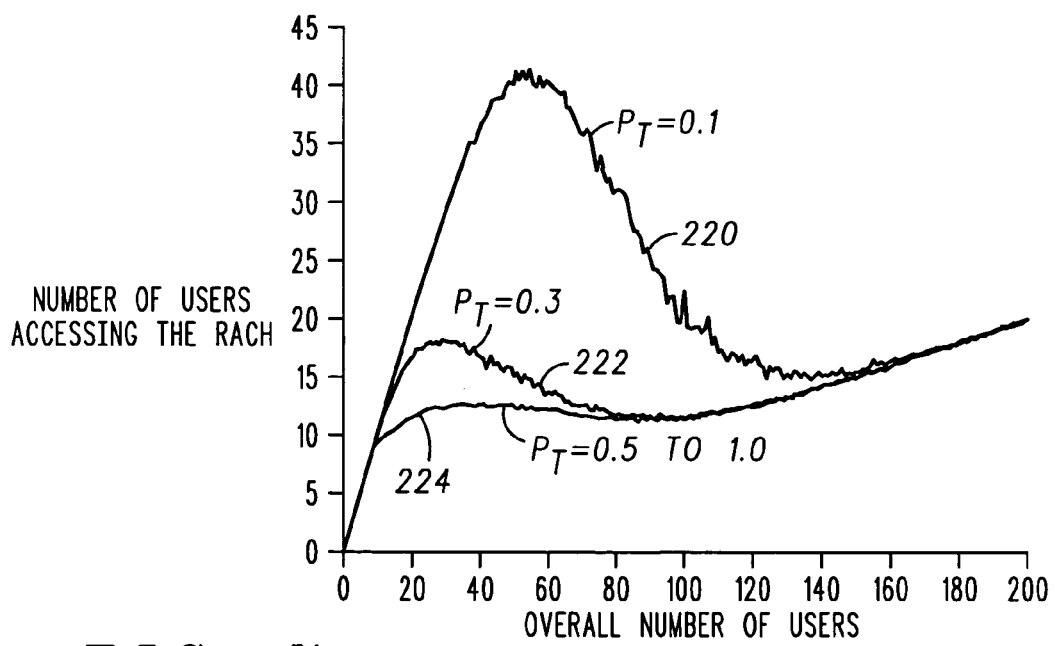
FIG. 7 is a graphic representation of a relationship between a number of users accessing an access channel versus the number of total users with a variable probability threshold in accordance with the present invention.

Referring to FIG. 6, a chart of the relationship between the number of user equipments that will be counted for MBMS access and the overall number of user equipments is shown. Graphic line 200 depicts an access probability factor P equal to 1. This produces a linear relationship between the number of MBMS users accessing the radio access channel and the overall number of users in a given cell.

Graphic line 210 represents this same relationship within an adaptive access probability factor provided by the present invention. It is to be noted that with the present method that for large numbers of MBMS users, near 200, a very small amount of users will access the radio access channel for counting, approximately 20. For the method of the present invention the appropriate number of users for counting to obtain the point-to-point/point-to-multipoint transition decision is relatively easy. For a fixed access probability factor P=1 overload of the radio access channel is known to be very large when the number of overall users is large. The present adaptive access probability factor keeps the number of counting users relatively low and dynamically adjusts the access probability factor P.

FIG. 7 again depicts the relationship between the number of users accessing the radio access channel and the overall number of users, applying different access probability factor thresholds $P_t$. Graph 220 depicts a representation for an access probability factor threshold of 0.1. As the overall number of users increases, the number of users accessing the radio channel increases substantially. With an access probability factor threshold of $P_t$ equal to 0.0.3, the number of users to be counted is substantially reduced as shown in graphic representation 222. Lastly, representation 224 shows a $P_t$ equal to 0.05 to 1.0. This is an optimal threshold which gives the best overall performance. However, the value to set $P_t$ depends on the actual operating system. For example, if the system can tolerate more overload a smaller value of $P_t$ may be better, for example 0.3.

The present method provides the following advantages by setting a small initial value $P_{init}$, a fast convergence in performed by the method and the number of counting overloads is substantially reduced. The user equipment will use a probability factor to determine whether it will join the counting. As a result, each user equipment will at most be counted once. The initial probability $P_{init}$ is optimized based on the single broadcast success probability for a number of users. The $P_t$ value is optimized by trade off between the number of broadcast times and the counting overload.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A method for adapting an access probability for a Multimedia Broadcast Multicast Service (MBMS) service for a communication system comprising:
   determining a quantity of mobile stations subscribed to the MEMS service;
   setting an initial access probability factor;
   broadcasting a control message comprising the initial access probability factor;

receiving from one or more mobile stations, a response to the control message;

determining whether a number of received responses from the mobile stations is zero; and if the number of received responses is not zero, adapting a new access probability factor equal to the initial access probability factor multiplied by a ratio of a number of point-to-point connections divided by a number of point-to-multipoint connections to the number of received responses.

2. The method as claimed in claim 1, wherein there is further included a step of if the number of received responses is zero, setting the new access probability factor equal to 1.

3. The method as claimed in claim 2, wherein if the number of received responses is not equal to zero, there is further included a step of determining whether the new access probability factor is greater than a threshold value.

4. The method as claimed in claim 3, wherein if the new access probability factor is greater than the threshold value, there is further included a step of setting the new access probability factor equal to 1.

5. The method as claimed in claim 4, wherein there is further included a step of determining whether the new access probability factor is greater than 1.

6. The method as claimed in claim 5 wherein if the new access probability factor is greater than 1, there is further included a step of selecting a point-to-point broadcast communication for access to the MBMS service.

7. The method as claimed in claim 6, wherein if the new access probability factor is greater than 1 there is further included a step of adjusting the initial access probability factor to be equal to the new access probability factor.

8. The method as claimed in claim 1, wherein after the step of receiving from one or more mobile stations, there is further included a step of determining whether the number of received responses is greater than a ratio of point-to-point connections to a number of point-to-multipoint connections.

9. The method as claimed in claim 8, wherein if the ratio of the number of received responses is greater than the ratio of the number of point-to-point connections to the number of point-to-multipoint connections, there is further included a step of selecting a point-to-multipoint broadcast for MBMS service.

10. The method as claimed in claim 9, wherein there is further included a step of adjusting the initial access probability factor to be equal to the new access probability factor multiplied by a ratio of the number of point-to-point connections divided by the number of point-to-multipoint connections to the number of received responses.

11. The method as claimed in claim 1, wherein the communication system includes a Code Division Multiple Access (CDMA) communication system.

12. The method as claimed in claim 1, wherein the communication system includes a General Packet Radio Service (GPRS) communication system.

13. The method as claimed in claim 1, wherein the communication system includes an Orthogonal Frequency Division Multiple Access (OFDM) communication system.

14. A method for adapting an access probability for a Multimedia Broadcast Multicast Service (MBMS) service for a communication system comprising:

determining a quantity of mobile stations subscribed to the MBMS service;

setting an initial access probability factor;

broadcasting a control message comprising the initial access probability factor;

receiving from one or more mobile stations, a response to the control message;

determining whether a number of received responses from the mobile stations is zero;

if the number of received responses is not zero, adapting a new access probability factor equal to the initial access probability factor multiplied by a ratio of the number of point-to-point connections divided by the number of point-to-multipoint connections to the number of received responses; and determining by a mobile station whether a control connection between the mobile station and the communication system exists.

15. The method as claimed in claim 14, wherein if the control connection does not exist, there is further included a step of selecting a random number between zero and one.

16. The method as claimed in claim 15, wherein there is further included a step of determining whether the selected random number is less than the new access probability factor.

17. The method as claimed in claim 16, wherein if the selected random number is less than the new access probability factor, there is further included a step of establishing by the mobile station a connection with the communication system.

18. The method as claimed in claim 14, wherein there is further included a step of if the number of received responses is zero, setting the new access probability factor equal to 1.

19. The method as claimed in claim 18, wherein if the number of received responses is not equal to zero, there is further included a step of determining whether the new access probability factor is greater than a threshold value.

20. The method as claimed in claim 19, wherein if the new access probability factor is greater than the threshold value, there is further included a step of setting the new access probability factor equal to 1.

21. The method as claimed in claim 20, wherein there is further included a step of determining whether the new access probability factor is greater than 1.

22. The method as claimed in claim 21, wherein if the new access probability factor is greater than 1, there is further included a step of selecting a point-to-point broadcast communication for access to the MBMS service.

23. The method as claimed in claim 22, wherein if the new access probability factor is greater than 1 there is further included a step of adjusting the initial access probability factor to be equal to the new access probability factor.

24. The method as claimed in claim 14, wherein after the step of receiving from one or more mobile stations, there is further included a step of determining whether the number of received responses is greater than a ratio of a number of point-to-point connections to a number of point-to-multipoint connections.

25. The method as claimed in claim 24, wherein if the ratio of the number of received responses is greater than the ratio of the number of point-to-point connections to the number of point-to-multipoint connections, there is further included a step of selecting a point-to-multipoint broadcast for MBMS service.

26. The method as claimed in claim 25, wherein there is further included a step of adjusting the initial access probability factor to be equal to the new access probability factor multiplied by a ratio of the number of point-to-point connections divided by the number of point-to-multipoint connections to the number of received responses.

27. The method as claimed in claim 14, wherein the step of determining whether a control connection exists includes a step of counting by a base station of the communication system the mobile station as an MBMS service user.

28. The method as claimed in claim 27, wherein the step of counting includes a step of counting the mobile station as an MBMS service user by each of a plurality of base stations of the communication system having a control connection with the mobile station.

* * * * *